United States Patent [19]

Hostettler

[11] Patent Number: 4,722,946

[45] Date of Patent: Feb. 2, 1988

[54] ENERGY-ATTENUATING POLYURETHANES

[75] Inventor: Fritz Hostettler, Whitehall, Pa.

[73] Assignee: Polymer Dynamics (Delaware), Ltd., Wilmington, Del.

[21] Appl. No.: 881,826

[22] Filed: Jul. 3, 1986

[51] Int. Cl.[4] .............................................. C08G 18/48
[52] U.S. Cl. .................................... 521/158; 521/159; 521/161; 521/167; 521/172; 521/173; 521/175; 521/176; 528/59; 528/60; 528/65; 528/66; 528/75; 528/76; 528/77; 528/78; 528/80; 528/81; 528/83
[58] Field of Search ............... 521/158, 159, 161, 167, 521/172, 173, 175, 176; 528/59, 60, 65, 66, 75, 76, 77, 78, 80, 81, 83

[56] References Cited

U.S. PATENT DOCUMENTS

| | | | |
|---|---|---|---|
| 3,781,231 | 12/1973 | Janssen et al. | 260/2.5 |
| 4,209,593 | 6/1980 | Khanna | 521/163 |
| 4,230,168 | 10/1980 | Kaneda et al. | 152/310 |
| 4,287,307 | 9/1981 | Hostettler | 521/51 |
| 4,346,205 | 8/1982 | Hiles et al. | 521/110 |
| 4,476,258 | 10/1984 | Hiles | 523/212 |

*Primary Examiner*—Maurice J. Welsh

[57] ABSTRACT

A non-liquid, energy-absorbing polyurethane is derived from the process which comprises reacting a mixture of linear and branched polyols, a polyisocyanate and, optionally, a blowing agent, under polyurethane-forming conditions at an isocyanate index of from about 65 to about 85.

55 Claims, No Drawings

ENERGY-ATTENUATING POLYURETHANES

BACKGROUND OF THE INVENTION

This invention relates to viscoelastic, shock-attenuating polyurethane elastomers and foams and to their preparation.

Polyurethanes and other types of elastomers and foams are being used extensively in many kinds of safety padding, e.g., knee protectors for contact sports such as wrestling, protective knee, shoulder and arm pads for football and soccer players, ice hockey and basketball players, and the like. Conventional polyurethane foams and elastomers currently in use for these applications are intended to perform the functions of load distribution and energy attenuation or absorption. Experimental and practical evidence shows that although such foams and elastomers are good load distributors, they are frequently deficient in their shock and energy-attenuating capabilities. Ball rebound and pendulum impact test data for many of these foams and elastomers reveal that they possess fairly high rebound velocity due to their relatively low hysteresis. Moreover, they exhibit high-peak deceleration and severity index. Neither of these properties are conducive to their functioning as good energy-attenuating polymeric substances.

In the field of footwear, insoles, outsoles, and other footwear components exhibiting energy-moderating or attenuating properties have been known for some time. Semi-flexible urethane foams have been used extensively in automotive interior safety padding such as crash pads, sun visors, arm rests, door panels, steering wheel panels, and the like. Stiffer semi-flexible foams and elastomers have been used in exterior safety applications, in particular, as shock-attenuating bumpers.

However, most of the products utilized by the automotive and footwear manufacturers exhibit relatively low hysteresis which is detrimental to good energy-attenuation. Other approaches have taken the form of a combination of a polyurethane exterior deformable front-pad backed by a relatively complicated hydraulic shock absorption system as, for example, represented by the newer automotive bumpers. Such approaches are not desirable from an economic point of view.

Attempts have been made to modify polyurethane foams and elastomers to obtain materials which possess more efficient energy-attenuating properties. U.S. Pat. No. 4,209,593 describes semi-flexible shock-absorbing polyurethane foams prepared from a polyether triol, a compound having a single reactive hydrogen, an aromatic polyisocyanate, blowing agent, chain extender and a catalyst. While these materials exhibit good shock-absorbing properties, the single reactive hydrogen reactant which is a naphthol, naphtholamine or a hydroabietyl alcohol imparts the undesirable characteristic odor of these aromatic compounds to the resulting foam. Other single reactive hydrogen reactants described in this patent are known carcinogens. Accordingly, this approach to shock-absorbing polyurethanes is not particularly desirable.

U.S. Pat. Nos. 4,346,205 and 4,476,258 are said to provide energy absorbing polyurethane foam and elastomer compositions having densities of 0.40 to 1.34 gm/cc. An attempt to repeat the examples of these two patents has revealed them to be inoperative since they only yield liquid materials which cannot be employed for the purposes intended. Other experiments within the broader disclosure of these patents have also resulted only in liquid materials. Such liquid materials are not useful for the purposes stated in these patents.

U.S. Pat. No. 4,230,168 describes the manufacture of high resiliency tire filling compounds from polyether polyols having equivalent weights from 900 to 1800, and polyisocyanates at isocyanate indexes of 0.8 to 2.0. The resulting polyurethanes exhibit very high rebound resiliency and are not suitable as energy-moderating polymers.

SUMMARY OF THE INVENTION

It is an object of the invention to provide shock-attenuating non-liquid viscoelastic polyurethane elastomers and foams.

It is another object of the invention to provide polyurethane foams and elastomers exhibiting low rebound velocity and high hysteresis, among other desirable characteristics, which are conducive to their functioning as good energy-attenuating materials.

In accordance with these and other objects of the invention, energy-absorbing (attenuating) polyurethane elastomers and foams are provided which are prepared by reacting a blend of linear and branched polyols, additional cross-linkers and/or chain extenders if desired, a polyisocyanate and, optionally, a blowing agent if desired, in the presence of a catalyst, at an isocyanate index range of from about 65 to about 85.

The isocyanate index is defined as follows:

$$\text{Isocyanate (NCO) Index} = \frac{\text{Equivalents of NCO}}{\text{Equivalents of reactive hydrogen as determined by the Zerewitinoff test}} \times 100$$

The materials of the present invention are solid (non-liquid) energy-attenuating polyurethane elastomers and foams having viscoelastic properties and generally low rebound resiliency, for example, less than about 25 percent, as measured by the pendulum method described by Zwick (DIN 53512).

The lower rebound velocity (higher hysteresis) of the polyurethane elastomers and foams of this invention produces low peak deceleration on impact (low severity index) and, consequently, improved energy-absorbing (attenuating) efficiency.

The energy-attenuating polyurethane elastomers and foams of the present invention are capable of repeatedly absorbing shock without structural damage and without appreciable sag (compression set) due to prolonged exposure to continuous dynamic loading. The polyurethane foams and elastomers of the present invention are especially suitable as shoe sole inserts or as inserts in unit soles for work shoes, leisure footwear and various athletic shoes since they are capable of reducing peak deceleration associated with heel strike in walking, running and jumping.

The properties of the high hysteresis viscoelastic polyurethane elastomers and foams of the present invention are also of great importance for dynamic energy absorption in vibration dampening devices, sound attenuation, various energy absorbing bumpers, bushings, sleeves, and the like. Typical additional examples are protective tool handles, gloves for workers handling air hammers and chippers, vibration-attenuating seal mounts, bicycle and motor cycle seats, and the like.

DESCRIPTION OF THE PREFERRED EMBODIMENTS

It has surprisingly been found that the disadvantages associated with prior polyurethanes as discussed above can be overcome by using as starting materials for the production of the energy-attenuating viscoelastic polyurethane elastomers and foams of this invention, mixtures of linear and branched polyol intermediates, polyisocyanates and, optionally, extenders, blowing agents, and the like, in the presence of a catalyst whereby the isocyanate index as defined above is varied from about 65 to about 85.

The hydroxyl containing polyol intermediates used in the production of the energy-attenuating viscoelastic polyurethane elastomers and foams herein are compounds containing from 2 to about 8 and more, preferably from 2 to 4, primary and/or secondary hydroxyl groups having a molecular weight of from about 200 to about 5,000, and more preferably from about 250 to about 4,000, and most preferably from about 300 to about 3,000. The preferred hydroxyl-containing materials are polyether polyols, polyester polyols, and hydroxyl-containing polybutadienes.

In general, it is particularly useful to use blends of relatively high molecular weight diol and/or triol polyethers having equivalent weights of from about 500 to about 1,500 with trifunctional and/or higher functional low molecular weight polyethers polyols having equivalent weights of from about 60 to about 200 whereby the ratio of diol equivalents to the higher functional low molecular weight polyol equivalents is from about 0.8-1 to as high as about 3.5:1 or higher, preferably from about 1:1.5, and more preferably from about 1:2.5. The average equivalent weight of the mixture is generally from about 200 to about 1200, preferably from about 250 to about 800, and more preferably from about 250 to about 450.

Polyethers can be obtained in a known manner and include those obtained by reacting starter compounds containing reactive hydrogen atoms with 1,2-alkylene oxides such as ethylene oxide, propylene oxide, butylene oxide, styrene oxide, epichlorohydrin or with mixtures of these alkylene oxides. In many cases, it is preferred to use polyethers of the type which contain substantial amounts of primary hydroxyl groups, e.g., those in which at least 10% by weight of the hydroxyl groups are primary hydroxyl groups. Suitable starter compounds containing reactive hydrogen atoms include water, ethylene glycol, 1,2- or 1,3-propylene glycol, 1,4- or 2,3-butylene glycol, 1,6-hexanediol, 1,8-octanediol, neopentylene glycol, 1,4-bis-hydroxymethyl cyclohexane, 2-methyl-1,3-propanediol, glycerol, trimethylol propane, 1,2,6-hexanetriol, pentaerythritol, mannitol, sorbitol, methyl glucoside, sucrose, resorcinol, hydroquinone, 1,1,3-tris-(hydroxyphenyl)propane, ammonia, ethylene diamine, tetra- or hexamethylene diamine, diethylene triamine, ethanolamine, diethanolamine, triethanolamine, aniline, phenylene diamine, 2,4- and 2,6-diaminotoluene, and polyphenyl-polymethylene polyamines of the type obtained by condensing aniline with formaldehyde. In addition, resin-like materials of the phenolformaldehyde type, e.g., Novolacs, can also be used as starters. Additional polyether polyols suitable for the purpose of the present invention include the so-called "polymer/polyols" which can be prepared by polymerizing vinyl monomers or isocyanates in the presence of polyamines, and the like, in situ in the presence of the polyols described hereinabove. Typical products and processes for the preparation of polymer/polyols are described in U.S. Pat. Nos.: 3,304,273; 3,383,351; 4,042,537; and 4,312,973, the disclosures of which are incorporated by reference herein.

Polyesters containing hydroxyl groups are also suitable for use in the present invention. These include the reaction products of polyhydric, preferably dihydric and optionally trihydric, alcohols with polyvalent, preferably divalent, carboxylic acids. In place of or in addition to the free polycarboxylic acids, the corresponding polycarboxylic acid anhydrides or esters of lower alcohols or mixtures thereof can also be used for producing the polyesters. The polycarboxylic acids can be aliphatic, cycloaliphatic, aromatic and/or heterocyclic and can optionally be substituted and/or unsaturated. Examples of polycarboxylic acids of this type include succinic acid, adipic acid, suberic acid, azelaic acid, sebacic acid, phthalic acid, isophthalic acid, trimellitic acid, phthalic acid anhydride, tetrahydrophthalic acid anhydride, hexahydrophthalic acid anhydride, tetrachloro- phthalic acid anhydride, endomethylene tetrahydrophthalic acid anhydride, glutaric acid anhydride, maleic acid, maleic acid anhydride, fumaric acid, dimeric and trimeric fatty acids, terephthalic acid dimethyl ester and terephthalic acid-bis-glycol ester. Suitable polyhydric alcohols include, for example, ethylene glycol 1,2- and 1,3-propylene glycol, 1,4- and 2,3-butylene glycol, 1,6-hexanediol, 1,8-octanediol, neopentylene glycol, cyclohexane dimethanol (1,4-bis-hydroxymethylcyclohexane), 2-methyl-1,3-propane diol, glycerol, trimethylol propane, 1,2,6-hexanetriol, trimethylol propane, 1,2,6-hexane triol, trimethylol ethane, pentaerythritol, quinitol, mannitol and sorbitol, methyl glucoside, diethylene glycol, triethylene glycol, tetraethylene glycol, polyethylene glycols, dipropylene glycol, polypropylene glycols, dibutylene glycol and polybutylene glycols. Polyesters of lactones, for example, epsilon-caprolactone, and hydroxy carboxylic acids can also be used.

Other hydroxyl-containing compounds suitable for use in preparing the polyurethane elastomers and foams according to the present invention include polythioethers, polyacetal-containing polycarbonates, polyester amides and other synthetic and natural polyols.

Among the polythioethers, reference is made in particular to the condensation products of thiodiglycol alone and/or with other glycols, dicarboxylic acids, formaldehyde, aminocarboxylic acids or aminoalcohols. Depending upon the co-components, the products are polythio-mixed ethers, polythio-ether esters or polythio-ether ester amides.

Suitable polyacetals include compounds which are obtained from glycols such as diethylene glycol, triethylene glycol, 4,4'-dioxethoxydiphenyl dimethyl methane, 1,6-hexane diol and formaldehyde. Polyacetals suitable for use in accordance with the invention can also be obtained by polymerizing cyclic acetals.

Suitable polycarbonates containing hydroxyl groups are known and include those which can be obtained, for example, by reacting diols, such as 1,3-propanediol, 1,4-butanediol and/or 1,6-hexanediol, diethylene glycol, triethylene glycol and tetraethylene glycol with diaryl carbonates, for example, diphenyl carbonate or phosgene.

The polyester amides include the predominantly linear condensates obtained from dicarboxylic acids or their anhydrides and mixtures of polyhydric saturated and unsaturated amino alcohols with polyhydric alcohols, for example, glycols.

Suitable hydroxyl-terminated diene homopolymers and copolymers useful in this invention can be prepared by well known procedures. The preparation of typical polyols including hydroxyl-terminated homopolymers and copolymers of butadiene are described in U.S. Pat. Nos. 3,427,366; 3,673,168; 3,674,743; and 4,202,950, the disclosures of which are incorporated by reference herein.

Polyhydroxyl compounds already containing urethane or urea groups and, optionally, modified natural polyols such as castor oil, carbohydrates and starch can also be used. Additional products of alkylene oxides with phenol-formaldehyde resins or even with urea-formaldehyde resins can also be used in accordance with the invention.

Representatives of the many and varied hydroxyl functional compounds which can be used in accordance with the invention are described, for example, in High Polymers, Vol. XVII, "Polyurethanes, Chemistry and Technology", by Saunders and Frisch, Interscience Publishers, New York, London, Vol. I, 1962, pages 32–42 and pages 44–54, and Vol. II, 1964, pages 5–6 and 198–199, the disclosure of which is incorporated by reference herein.

The isocyanates that are suitable for the reactions of the present invention include aliphatic, cycloaliphatic, araliphatic, aromatic and heterocyclic polyisocyanates of the type described, for example, by W. Siefken in Annalen der Chemie, 562, pages 75 to 136. Specific examples include ethylene diisocyanate, 1,4-tetramethylene diisocyanate, 1,6-hexamethylene diisocyanate, 1,12-dodecane diisocyanate, cyclobutane-1,3-diisocyanate, cyclohexane-1,3- and 1,4-diisocyanate and mixtures of these isomers; 1-isocyanato-3,3,5-trimethyl-5-isocyanato methyl cyclohexane; 2,4- and 2,6-hexahydrotolylene diisocyanate and mixtures of these isomers, perhydro-2,4'-and/or 4,4'-diphenylmethane diisocyanate, 1,3- and 1,4-phenylene diisocyanate, 2,4- and 2,6-tolylene diisocyanate and mixtures of these isomers, diphenylmethane-2,4'- and/or 4,4'-diisocyanate, napthyl- ene-1,5-diisocyanate, triphenylmethane-4,4', 4"-triiso- cyanate, polyphenylpolymethylene polyisocyanates of the type obtained by condensing aniline with formaldehyde, followed by phosgenation, a procedure well known in the art, polyisocyanates containing carbodiimide groups of the type described, for example, in U.S. Pat. No. 2,492,330, the disclosure of which is incorporated by reference herein, polyisocyanates containing allophanate groups, polyisocyanates containing isocyanurate groups, polyisocyanates containing urethane groups, polyisocyanates containing urea groups, and the like.

In general, it is especially preferred to use the readily accessible polyisocyanates, such as 2,4- and 2,6-tolylene diisocyanate and mixtures of these isomers ("TDI"), polyphenylpolymethylene polyisocyanates of the type obtained by condensing aniline with formaldehyde, followed by phosgenation, "crude" MDI and distilled or "pure" MDI, and polyisocyanates containing carbodiimide groups, urethane groups, allophanate groups, isocyanurate groups, urea groups or biuret groups ("modified polyisocyanates"). All of these compounds are well known in the patent literature. Further typical examples of modified liquid MDI types of isocyanates are described in U.S. Pat. No. 3,384,653 and various quasi-prepolymers are described in U.S. Pat. Nos. 3,394,164; 3,644,457; 3,457,200; 3,883,771; 4,469,616; and 4,559,366, the disclosures of which are incorporated by reference herein.

In the preparation of the energy-attenuating viscoelastic polyurethane elastomers and foams of the present invention, any of the above-mentioned polyols can be reacted with any of the isocyantes set forth and, optionally with a chain extending agent containing active hydrogen atoms which are reactive with NCO groups and having a molecular weight less than about 300 such as, for example, water, ethylene glycol, 1,3-propylene glycol, 1,3-butylene glycol, 1,4-butanediol, butenediol, butynediol, amylene glycol, neopentylene glycol, 1,4-phenylene-bis-(beta-hydroxyethyl) ether, 1,3-phenylene-bis-(beta-hydroxyethyl) ether, bis-(hydroxymethyl)-cyclohexane, 1,6 hexanediol, diethylene glycol, dipropylene glycol, N-phenyldiethanolamine, N-phenyldiisopropanolamine, and the like; amino alcohols such as, for example, ethanolamine, diethanolamine, 2-hydroxyethyl-N-amino benzenes, and the like; polyamines such as, for example, ethylene diamine, propylene diamine, butylene diamine, hexamethylene diamine, cyclohexylene diamine, phenylene diamines, tolylene diamines, xylyene diamines, 3,3'-dichlorobenzidene, 3,3'- dinitrobenzidine, 4,4'-methylene-bis(2-chloraniline), 3,3-dichloro-4,4'-biphenylene diamine, 2,6-diamino pyridine, 4,4'-diamino diphenylmethane, and the like; hydrazine, substituted hydrazines such as, for example, N,N'-dimethyl hydrazine, 1,6-hexamethylene-bis-hydrazine, carbodihydrazide, hydrazides of dicarboxylic acids and disulfonic acids such as adipic acid dihydrazide, oxalic acid dihydrazide, isophthalic acid dihydrazide, thiodipropionic acid dihydrazide, tartaric acid dihydrazide, 1,3-phenylenedisulfonic acid dihydrazide, omega-aminocaproic acid dihydrazide, bis-hydrazine carbonic esters of glycols such as many of the glycols heretofore mentioned, and the like.

Catalysts which are useful in producing polyurethanes in accordance with this invention include: (a) tertiary amines such as bis(dimethylaminoethyl) ether, trimethylamine, triethylamine, N-methylmorpholine, N-ethylmorpholine, N,N-dimethylbenzylamine, N,N-dimethylethanolamine, N,N,N',N'-tetramethyl-1,3-butanediamine, triethanolamine, 1,4-diazabicyclo [2.2.-2]octane, N,N-dimethylcyclohexylamine, N-methyldicyclohexylamine, 1,8-diazabicyclo [5,4,0]-undecene-7 and its salts such as phenol salt, hexanoate, and oleate; 2,4,6-tris (diaminomethyl) phenol, and the like; (b) tertiary phosphines such as trialkylphosphines, dialkylbenzylphosphines, and the like; (c) strong bases such as alkali and alkaline earth metal hydroxides, alkoxides, and phenoxides; (d) acidic metal salts of strong acids such as ferric chloride, stannic chloride, stannous chloride, antimony trichloride, bismuth nitrate and chloride, and the like; (e) chelates of various metals such as those which can be obtained from acetylacetone, benzoylacetone, trifluoracetylacetone, ethyl acetoacetate, salicylaldehyde, cyclopentanone-2-carboxylate, acetylacetone-imine, bis-acetylacetonealkylenediimines, salicylaldehydeimine, and the like, with various metals such as Be, Mg, Zn, Cd, Pb, Ti, Zr, Sn, As, Bi, Cr, Mo, Mn, Fe, Co, Ni, or such ions as MoO + +, UO+ +, and the like; (f) alcoholates and phenolates of various metals such as Ti(OR), Sn(OR), Al(OR), and the like, wherein R is alkyl or aryl and the reaction products of alcoholates with carboxylic acids, beta-diketones, and 2-(N,N-dialkylamino) alkanols, such as the well known chelates of titanium; (g) salts of organic acids with a variety of metals such as alkali metals, alkaline earth metals, Al, Sn, Pb, Mn, Co, Ni, and Cu, including, for example, sodium acetate, potassium laurate, calcium hexanoate, stannous acetate, stannous octoate, stannous oleate, lead octoate, metallic driers such as manganese and cobalt naphthenate, and the like; (h) organometallic derivatives of tetravalent tin, trivalent and pentavalent As, Sb, and Bi and metal carbonyls of iron and cobalt, mercury compounds such as arylmercury carboxylates, phenylmercury acetate and propionate, and the like.

Among the organotin compounds that deserve particular mention are dialkyltin salts of carboxylic acids, e.g., dibutyltin diacetate, dibutyltin dilaurate, dibutyltin maleate, dilauryltin diacetate, dioctyltin diacetate, dibutyltin-bis(4-methylaminobenzoate), dibutyltin-bis(6-methylaminocaproate), and the like. Dialkyltin mercaptides, in particular diakyltin dimercaptide carboxylic acid esters, can also be utilized. Similarly, there can be used a trialkyltin hydroxide, dialkyltin oxide, dialkyltin dialkoxide or dialkyltin dichloride. Examples of these compounds include trimethyltin hydroxide, tributyltin hydroxide, trioctyltin hydroxide, dibutyltin oxide, dioctyltin oxide, dilauryltin oxide, dibutyltin-bis(isopropoxide), dibutyltin-bis-(2-dimethylaminopentylate), dibutyltin dichloride, dioctyltin dichloride, and the like. All of the foreging tin catalysts and many others are well known in the art.

The tertiary amines can be used as primary catalysts for accelerating the reactive hydrogen/isocyanate reaction or as secondary catalysts in combination with one or more of the above noted metal catalysts. Metal catalysts, or combinations of metal catalysts, can also be employed as the accelerating agents without the use of amines. The catalysts are employed in small amounts, for example, from about 0.001 percent to about 2 percent or more, based on weight of the reaction mixture.

It is within the scope of the present invention to incorporate other additives such as fillers, pigments, surfactants, plasticizers, organic blowing agents, as stabilizers, and the like, in the manufacture of the energy-attenuating viscoelastic polyurethane elastomers and foams of this invention.

In addition to water, a chemically participating extender and carbon dioxide-producing blowing agent, foams can be prepared by the use of conventional organic blowing agents. Typical representative examples are trichlorofluromethane, methylene chloride, low boiling hydrocarbons, ethers and ketones, and the like. The use of water in combination with one or more organic blowing agent is also contemplated.

Particularly in the manufacture of foams, surface-active additives such as emulsifiers and foam stabilizers can be used. Suitable emulsifiers include, for example, the sodium salts of castor oil sulfonates and salts of fatty acids with amines such as oleic acid diethylamine and stearic acid diethanol amine. Alkali or ammonium salts of sulfonic acids such as dodecyl benzene sulfonic acid or dinaphthylmethane disulfonic acids can be used. The alkali or ammonium salts of fatty acids such as ricinoleic acid or of polymeric fatty acids can also be used as surface-active additives.

Suitable foam stabilizers include polyether siloxanes, particularly water-soluble block copolymers of siloxanes and polyethers. These compounds generally are prepared by joining a copolymer of ethylene oxide and propylene oxide or a homopolymer of ethylene oxide to a polydimethylsiloxane radical. Foam stabilizers of this type are described, for example, in U.S. Pat. Nos. 2,834,748; 2,917,480 and 3,629,308, the disclosures of which are incorporated by reference herein.

Suitable stabilizers against the effects of aging and weathering and substances having fungistatic and bacteriostatic effect can also be used. Typical additives of this type are phenolic and aromatic amine antioxidants, UV-stabilizers, hindered carbodiimides known to retard hydrolysis and oxidation, arsenic fungicidal compounds, tin and mercury bacteriocides, and the like.

Fillers which can be used for the purpose of extension or reinforcement of the elastomers and foams of the present invention include, among others, amorphous silicone hydroxides, carbon black, walnut and pecan shells, cork, cellulose, starch, calcium carbide, zinc oxide, titanium dioxide, clays, calcium wallastonite, and the like.

Useful plasticizers herein are those which are miscible with the polyol component. For example, aliphatic, alicyclic, and aromatic oils generally obtained from various crude oil sources are particularly suitable for use with the hydroxyl-terminated polybutadiene polyols. Plasticizers which are miscible with polyether polyols and polyester polyols include, for example, chlorinated paraffins, dialkyl phthalates, various esters of dibasic acids such as di-2-ethylhexyl adipate, polymeric adipates from adipic acid and various glycols, dioctyl azelate and sebacate, and the like. Still other plasticizers include certain low molecular weight polyethers which contain non-reactive end groups and a group of soluble plasticizers described in U.S. Pat. No. 4,287,307, the disclosure of which is incorporated by reference herein.

Of particular interest are formals and acetals of formaldehyde and acetaldehyde with alkylpolyoxyethylene and alkylpolyoxypropylene alcohols.

The plasticizers can be used in concentrations of about 2 percent by weight or less to as high as 30 percent or higher, based on the total polyurethane reaction product of the present invention.

It can be advantageous to incorporate flame retardants for the purpose of complying with various flammability tests required by governmental agencies such as the Department of Transportation, and the like. Approaches to this end are also described in "Kunststoff-Handbuch", Volume VII, edited by Vieweg and Hoechtlen, Carl Hanser Verlag, Munich, 1966, e.g., on pages 103 to 113.

It is also within the scope of the present invention to utilize internal mold release agents to avoid undue tackiness of the viscoelastic elastomers. Typical compounds of this type are organic silicone derivatives, for example Q2-5186 and Q2-7119 available from Dow Corning Corporation.

EXAMPLES

The following physical testing methods, reactants and polymer preparation procedures are common to all of the examples.

A. Physical Testing Methods

Apparatus used in evaluating physical testing of the viscoelastic elastomers includes Shore "00" hardness according to ASTM D2240, resilience according to the Zwick Rebound Pendulum DIN 53512, ball rebound resilience according to ASTM D3574-H, tear resistance according to ASTM D3574-F and tension testing according to ASTM D-412.

B. The Reactants

The reactants employed in the examples are described therein and in the accompanying tables. All polyols were degassed at 80°–90° C. under vacuum (15 mm Hg) for two hours to remove air and moisture.

All fillers were dried in an oven at 150° C. for eight hours and then heated in a vacuum oven to constant weight to remove moisture.

C. Polymer Preparation

In all of the examples which follow, the same general procedure was used. Thus, the polyol blend comprising polyols, catalysts, fillers, plasticizers, antifoam agents, internal mold release agents, and the like, was premixed followed by degassing the mixture at room temperature to eliminate all dissolved air. After adding the isocyanate thereto, the reactants were mixed either manually or mechanically, quickly degassed at room temperature until bubbling subsided, and the material was poured into an open mold having the desired thickness. After curing at 45°–50° C. for about 30 minutes, the resulting products were demolded and were characterized for dynamic mechanical properties approximately three to five days after molding. The standard physical properties of the products were determined at ambient temperature in accordance with the aforementioned ASTM or DIN methods.

COMPARATIVE EXAMPLES A, B, C AND D

In the following comparative examples, a mixture of a linear polyol blend of a relatively high molecular weight polypropylene glycol (M.W.=2000) and a relatively low molecular weight polypropylene glycol (M.W.=400) were reacted at isocyanate indexes of from 70–100. Under these conditions, none of the resulting products was a useful solid viscoelastic elastomer. These results, which are set forth in Table I below, are in complete contrast to the results described in U.S. Pat. Nos. 4,346,205 and 4,476,258 both of which disclose that the isocyanate index should be below 50.

TABLE I

| | COMPARATIVE EXAMPLES A–D | | | |
|---|---|---|---|---|
| | EXAMPLE | | | |
| | A | B | C | D |
| PLURACOL 2010[1] | 30.0 | 30.0 | 30.0 | 30.0 |
| PLURACOL 410[2] | 10.0 | 10.0 | 10.0 | 10.0 |
| DABCO EG[3] | 1.0 | 1.0 | 1.0 | 1.0 |
| MONDUR CD[4] | 13.9 | 12.5 | 11.5 | 9.7 |
| INDEX | 100 | 90 | 80 | 70 |
| CONSISTENCY OF RESULTING PRODUCT | Chewing Gum | Chewing Gum | Liquid | Liquid |

[1]Polypropylene glycol having a molecular weight of about 2,000 available from BASF Corporation.
[2]Polypropylene glycol (a diol) having a molecular weight of about 400 available from BASF Corporation.
[3]A liquid catalyst blend consisting of one third by weight of 1.4-diazobicyclo (2.2.2) octane and two thirds by weight of ethylene glycol available from Air Products & Chemicals, Inc.
[4]Carbodiimide derivative of 4,4'- diphenylmethane diisocyanate, available from Mobay Chemical Company. Isocyanate equivalent weight approximately 143–145.

EXAMPLES 1–20

In contrast to foregoing Comparative Examples A-D, these examples utilize mixtures of relatively low molecular weight branched polyether polyols and fairly high molecular weight polypropylene glycols. Examples 1-8 employing a linear to branched equivalent ratio of 1:2.36 result in viscoelastic elastomers which are useful for the purpose of the present invention yielding good shock-attenuating properties as shown in Examples 4 to 7 at isocyanate indexes of from about 65 to about 80. At a linear to branched equivalent ratio of 1.0 to 1.18, the useful index range is from about 70 to about 85 as shown in Examples 11 to 14. At a linear to branched ratio of from about 1 to about 0.8, the useful index range is restricted to about 80.

It has been observed on the basis of numerous resiliency tests both by means of the Zwick Pendulum Rebound and also by means of the Ball Rebound Test that useful shock-attenuating viscoelastic elastomers can be obtained when the Zwick Rebound levels are not much higher than about 25% and the Ball Rebound levels according to ASTM D3574-H are no higher than about 20%. However, it has also been observed that satisfactory shock-attenuating products contemplated for the purpose of the present invention are only attained at Shore 00 hardnesses of about 85 or lower. At hardness ranges above about 85 Shore 00, the viscoelastic elastomer can no longer be sufficiently deformed to moderate, for example, heel strike in athletic footwear applications while at Shore "00" hardness ranges below about 10 to about 15, the resulting product behaves more like a liquid viscoelastic product rather than a solid or quasi-solid polyurethane. Consequently, the solid viscoelastic, shock-attenuating products of the present invention should possess Shore "00" hardnesses of from about 15 to about 85, preferably from about 30 to about 75, and still more preferably from about 40 to about 70, isocyanate indexes of from not lower than about 65 to no higher than about 85 or moderately higher, and should have a linear/branched equivalent weight ratio of from about 1:0.8 to about 1:3.5. Moreover, it has been determined that the average equivalent weight of the polyol blend should vary within the range of from about 200 to about 1200 to attain the shock moderating properties desired for the use of the products of this invention.

At equivalent weights of above about 1200, the resulting rebound resilience figures are too high to result in proper shock moderation, and at equivalent weights of below about 200, the resulting products tend to become rigid and too stiff for the purpose of this invention.

In essence, the proper balancing of the equivalent weight of the polyol and the proper isocyanate index employed in the preparation of the products of the present invention are quite critical in attaining the balance of deformation and rebound properties necessary for the engineering of such viscoelastic products.

The properties of the polyurethanes of Examples 1–20 are shown in Table II as follows:

TABLE II

| EFFECT OF ISOCYANATE INDEX ON PHYSICAL PROPERTIES | | | | | | | | |
|---|---|---|---|---|---|---|---|---|
| POLYOL RATIO:LINEAR:BRANCHED (BY EQUIVALENT) = 1.00:2.36 | | | | | | | | |
| EXAMPLE | 1 | 2 | 3 | 4 | 5 | 6 | 7 | 8 |
| NIAX DIOL PPG 2025 | 60.0 | 60.0 | 60.0 | 60.0 | 60.0 | 60.0 | 60.0 | 60.0 |
| PLURACOL TP 440 | 20.0 | 20.0 | 20.0 | 20.0 | 20.0 | 20.0 | 20.0 | 20.0 |

TABLE II-continued

EFFECT OF ISOCYANATE INDEX ON PHYSICAL PROPERTIES

| RATIO:LINEAR: BRANCHED BY EQUIVALENT | 1.00/2.36 | 1.00/2.36 | 1.00/2.36 | 1.00/2.36 | 1.00/2.36 | 1.00/2.36 | 1.00/2.36 | 1.00/2.36 |
|---|---|---|---|---|---|---|---|---|
| DABCO EG | 0.4 | 0.4 | 0.4 | 0.4 | 0.4 | 0.4 | 0.4 | 0.4 |
| POLYCAT SA-102[7] | 0.8 | 0.8 | 0.8 | 0.8 | 0.8 | 0.8 | 0.8 | 0.8 |
| MONDUR CD | 30.1 | 27.1 | 25.5 | 24.1 | 22.6 | 21.1 | 19.6 | 18.1 |
| INDEX | 100 | 90 | 85 | 80 | 75 | 70 | 65 | 60 |
| SHORE "00" HARDNESS | | | | | | | | |
| 1 DAY | 90 | 86 | 82 | 77 | 70 | 63 | 40 | Chewing Gum |
| 2-3 WEEKS | 93 | 91 | 90 | 85 | 82 | 74 | 65 | — |
| ZWICK RESILIENCE, % | 12.3 | 11.0 | 11.0 | 10.8 | 10.5 | 10.0 | 8.0 | — |
| BALL REBOUND | | | | | | | | |
| RESILIENCE, % | 7.0 | 7.0 | 7.0 | 7.0 | 7.0 | 6.5 | 6.0 | |
| TEAR RESISTANCE, PLI. | 53.9 | 37.4 | 26.3 | 18.5 | 13.6 | 9.1 | 6.3 | |

| POLYOL RATIO:LINEAR:BRANCHED (BY EQUIVALENT) = 1.00:1.18 | | | | | | | |
|---|---|---|---|---|---|---|---|
| EXAMPLE | 9 | 10 | 11 | 12 | 13 | 14 | 15 |
| NIAX DIOL PPG 2025 [5] | 60.0 | 60.0 | 60.0 | 60.0 | 60.0 | 60.0 | 60.0 |
| PLURACOL TP 440 [6] | 10.0 | 10.0 | 10.0 | 10.0 | 10.0 | 10.0 | 10.0 |
| RATIO:LINEAR: BRANCHED BY EQUIVALENT | 1.00/1.18 | 1.00/1.18 | 1.00/1.18 | 1.00/1.18 | 1.00/1.18 | 1.00/1.18 | 1.00/1.18 |
| DABCO EG | 0.4 | 0.4 | 0.4 | 0.4 | 0.4 | 0.4 | 0.4 |
| POLYCAT SA-102 [7] | 0.8 | 0.8 | 0.8 | 0.8 | 0.8 | 0.8 | 0.8 |
| MONDUR CD | 19.9 | 18.0 | 17.0 | 16.0 | 15.0 | 14.0 | 13.0 |
| INDEX | 100 | 90 | 85 | 80 | 75 | 70 | 65 |
| SHORE "00" HARDNESS | | | | | | | |
| 1 DAY | 85 | 78 | 71 | 59 | 42 | 20 | Chewing Gum |
| 2-3 WEEKS | 80 | 84 | 79 | 74 | 65 | 50 | — |
| ZWICK RESILIENCE, % | 27.0 | 23.5 | 20.0 | 17.0 | 13.8 | 10.0 | — |
| BALL REBOUND | | | | | | | |
| RESILIENCE, % | 16.0 | 15.0 | 14.5 | 13.0 | 10.5 | 8.0 | — |
| TEAR RESISTANCE, PLI | 30.4 | 19.3 | 13.6 | 11.0 | 7.6 | 5.6 | — |

| POLYOL RATIO:LINEAR:BRANCHED (BY EQUIVALENT) = 1.00:0.79 | | | | | |
|---|---|---|---|---|---|
| EXAMPLE | 16 | 17 | 18 | 19 | 20 |
| NIAX DIOL PPG 202 | 90.0 | 90.0 | 90.0 | 90.0 | 90.0 |
| PLURACOL TP 440 | 10.0 | 10.0 | 10.0 | 10.0 | 10.0 |
| RATIO:LINEAR: BRANCHED BY EQUIVALENT | 1.00/0.79 | 1.00/0.79 | 1.00/0.79 | 1.00/0.79 | 1.00/0.79 |
| DABCO EG | 0.5 | 0.5 | 0.5 | 0.5 | 0.5 |
| POLYCAT SA-102 | 1.0 | 1.0 | 1.0 | 1.0 | 1.0 |
| ISONATE 143-L[8] | 24.6 | 22.1 | 19.2 | 17.2 | 15.2 |
| INDEX | 100 | 90 | 80 | 70 | 60 |
| SHORE "00" HARDNESS | | | | | |
| 1 DAY | 83 | 74 | 48 | Chewing Gum | Liquid |
| 2-3 WEEKS | 85 | 76 | 54 | Chewing Gum | Liquid |
| ZWICK RESILIENCE, % | 41.3 | 29.0 | 14.7 | — | — |
| BALL REBOUND RESILIENCE, % | 27.0 | 21.0 | 13.0 | — | — |

[5] Polypropylene glycol having a molecular weight of about 2000 available from Union Carbide Corporation.
[6] Propylene oxide adduct of trimethylolpropane having a molecular weight of about 420–425 available from BASF Corporation.
[7] Air Products Corporation; a salt comprising 51% by weight of 1.8-diazobicyclo (5.4.0) undecene -7 and 49% by weight of 2-ethylhexanoic acid.
[8] Dow Chemical Company; a carbodiimide derivative of 4,4'-di-phenyl-methane diisocyanate having an isocyanate equivalent weight of approximately 143–145.

EXAMPLES 21-27

These examples illustrate the use of from 5–35 parts of Benzoflex 9-88 plasticizer (dipropylene glycol dibenzoate) per 70 parts of polyether blend, linear to branched ratio by equivalents about 1.0 to 1.2, at an isocyanate index of about 80. The results, described in Table III, show that the materials are useful over the entire plasticizer range. Other plasticizers such as dioctyl phthalate (DOP), TP-90B (the formal of butoxydiethylene glycol available from Thiokol Corporation) and many other plasticizers are also useful for the purpose of the present application. However, as demonstrated in the previous examples, shock-attenuating viscoelastic elastomers can also be prepared without the use of plasticizer.

TABLE III

EFFECT OF AMOUNT OF PLASTICIZER ON PHYSICAL PROPERTIES

| EXAMPLE | 21 | 22 | 23 | 24 | 25 | 26 | 26 |
|---|---|---|---|---|---|---|---|
| NIAX DIOL PPG 202 | 60.0 | 60.0 | 60.0 | 60.0 | 60.0 | 60.0 | 60.0 |
| PLURACOL TP 440 | 10.0 | 10.0 | 10.0 | 10.0 | 10.0 | 10.0 | 10.0 |
| RATIO: LINEAR; EQUIVALENT | 1.00/1.18 | 1.00/1.18 | 1.00/1.18 | 1.00/1.18 | 1.00/1.18 | 1.00/1.18 | 1.00/1.18 |
| DABCO EG | 0.4 | 0.4 | 0.4 | 0.4 | 0.4 | 0.4 | 0.4 |
| POLYCAT SA-102 | 0.8 | 0.8 | 0.8 | 0.8 | 0.8 | 0.8 | 0.8 |
| BENZOFLEX 9-88[9] | 5.0 | 10.0 | 15.0 | 17.5 | 20.0 | 26.2 | 35.0 |
| ISONATE 143-L | 16.0 | 16.0 | 16.0 | 16.0 | 16.0 | 16.0 | 16.0 |
| INDEX | 80 | 80 | 80 | 80 | 80 | 80 | 80 |
| SHORE "00" HARDNESS | | | | | | | |
| 1 DAY | 61 | 63 | 60 | 62 | 60.0 | 58 | 44 |
| 2-3 WEEKS | 66 | 68 | 65 | 62 | 61 | 62 | 46 |

TABLE III-continued

| EFFECT OF AMOUNT OF PLASTICIZER ON PHYSICAL PROPERTIES | | | | | | | |
|---|---|---|---|---|---|---|---|
| EXAMPLE | 21 | 22 | 23 | 24 | 25 | 26 | 26 |
| ZWICK RESILIENCE, % | 21.0 | 23.5 | 23.5 | 24.0 | 23.3 | 21.5 | 18.3 |
| BALL REBOUND RESILIENCE, % | 14.0 | 16.0 | 15.5 | 15.0 | 15.0 | 17.0 | 11.5 |

[9]VELSICOL CHEMICAL CORPORATION; dipropylene glycol dibenzoate, a plasticizer.

EXAMPLES 28–33

These examples illustrate the use of calcium carbonate as a filler in the manufacture of viscoelastic shock-attenuating elastomers in accordance with this invention, the data being set forth in Table IV. Other fillers, for example, amorphous silicas, wallastonite, clays, talc, mica, and the like, can also be advantageously employed.

TABLE IV

| EFFECT OF AMOUNT OF FILLER ON PHYSICAL PROPERTIES | | | | | | |
|---|---|---|---|---|---|---|
| EXAMPLE | 28 | 29 | 30 | 31 | 32 | 33 |
| PPG 2025 | 90.0 | 90.0 | 90.0 | 90.0 | 90.0 | 90.0 |
| TP 440 | 30.0 | 30.0 | 30.0 | 30.0 | 30.0 | 30.0 |
| RATIO:LINEAR: BRANCHED BY EQUIVALENT | 1.00/2.36 | 1.00/2.36 | 1.00/2.36 | 1.00/2.36 | 1.00/2.36 | 1.00/2.36 |
| DABCO EG | 0.6 | 0.6 | 0.6 | 0.6 | 0.6 | 0.6 |
| SA-102 | 1.2 | 1.2 | 1.2 | 1.2 | 1.2 | 1.2 |
| Q2-5186[10] | 2.0 | 2.0 | 2.0 | 2.0 | 2.0 | 2.0 |
| Blue (pigment) | 1.2 | 1.2 | 1.2 | 1.2 | 1.2 | 1.2 |
| $CaCO_3$[11] | 13.6 | 30.7 | 52.7 | 82.0 | 82.0 | 82.0 |
| %, based on polyol blend | 10 | 20 | 30 | 40 | 40 | 40 |
| ISONATE 143-L | 33.9 | 33.9 | 33.9 | 33.9 | 31.7 | 29.4 |
| INDEX | 75 | 75 | 75 | 75 | 70 | 65 |
| SHORE "00" HARDNESS | | | | | | |
| 1 DAY | 69 | 72 | 75 | 77 | 62 | 44 |
| 2-3 WEEKS | 80 | 81 | 84 | 85 | 77 | 58 |
| ZWICK RESILIENCE, % | 12.8 | 13.0 | 12.5 | 12.0 | 10.5 | 8.5 |
| BALL REBOUND RESILIENCE, % | 8.5 | 8.5 | 8.0 | 8.0 | 7.0 | 6.0 |

[10]An internal silicone mold release fluid from Dow Corning Corporation.
[11]Dolocron 4512 pulverized dolomitic limestone (Pfizer, Inc.) containing 55% by weight calcium carbonate and 43% by weight magnesium carbonate.

EXAMPLES 34–43

These examples illustrate the use of a combination of plasticizer, filler and a polyether blend having a linear to branched equivalent ratio of 1 to about 2.4, at an isocyanate index range of 65 to 80. Within this range, a series of useful products is obtained. Again, it should be noted that at an index range of 0.6, in contrast to the results disclosed in U.S. Pat. No. 4,346,205, the product is no longer a solid urethane elastomer and is not suitable for the purposes of the present invention.

TABLE V

| EFFECT OF ISOCYANATE INDEX ON PHYSICAL PROPERTIES (WITH PLASTICIZER AND FILLER) | | | | | | | | | | |
|---|---|---|---|---|---|---|---|---|---|---|
| EXAMPLE | 34 | 35 | 36 | 37 | 38 | 39 | 40 | 41 | 42 | 43 |
| PPD 2025 | 60.0 | 60.0 | 60.0 | 60.0 | 60.0 | 60.0 | 60.0 | 60.0 | 60.0 | 60.0 |
| TP 440 | 20.0 | 20.0 | 20.0 | 20.0 | 20.0 | 20.0 | 20.0 | 20.0 | 20.0 | 20.0 |
| RATIO:LINEAR: BRANCHED BY EQUIVALENT | 100/2.36 | 100/2.36 | 100/2.36 | 100/2.36 | 100/2.36 | 100/2.36 | 100/2.36 | 100/2.36 | 100/2.36 | 100/2.36 |
| DABCO EG | 0.4 | 0.4 | 0.4 | 0.4 | 0.4 | 0.4 | 0.4 | 0.4 | 0.4 | 0.4 |
| SA-102 | 0.8 | 0.8 | 0.8 | 0.8 | 0.8 | 0.8 | 0.8 | 0.8 | 0.8 | 0.8 |
| BENZOFLEX 9-88 | 20.0 | 20.0 | 20.0 | 20.0 | 20.0 | 30.0 | 30.0 | 30.0 | 30.0 | 30.0 |
| $CaCO_3$ | 40.0 | 40.0 | 40.0 | 40.0 | 40.0 | 60.0 | 60.0 | 60.0 | 60.0 | 60.0 |
| ISONATE 143-L | 24.1 | 22.6 | 21.1 | 19.6 | 18.0 | 24.1 | 22.6 | 21.1 | 19.6 | 18.0 |
| INDEX | 80 | 75 | 70 | 65 | 60 | 80 | 75 | 70 | 65 | 60 |
| SHORE "00" HARDNESS | | | | | | | | | | |
| 1 DAY | 81 | 76 | 68 | 50 | Chewing Gum | 78 | 74 | 63 | 51 | Chewing Gum |
| 2-3 Weeks | 83 | 77 | 68 | 54 | — | 82 | 74 | 66 | 54 | — |
| ZWICK RESILIENCE, % | 19.3 | 18.3 | 16.0 | 11.3 | — | 22.8 | 19.8 | 16.0 | 12.3 | — |

What is claimed is:

1. A non-liquid, energy-absorbing polyurethane resulting from the process which comprises reacting a mixture of linear and branched polyols, a polyisocyanate and, optionally, a blowing agent, under polyurethane-forming conditions at an isocyanate index of from about 65 to about 85.

2. The polyurethane of claim 1 wherein the polyol comprises a mixture of at least one relatively high molecular weight polyol possessing two or three hydroxyl groups and having an equivalent weight of from about 500 to about 1500 and at least one relatively low molecular weight polyol possessing at least three hydroxyl groups and having an equivalent weight of from about 60 to about 200, the equivalent weight of the polyol mixture being from about 200 to about 1200 and the ratio of relatively high molecular weight to the ratio of relatively low molecular weight polyol equivalents being from about 1:0.8 to about 1:3.5.

3. The polyurethane of claim 2 possessing a Shore "00" hardness of from about 15 to about 85 and the average equivalent weight of the polyol mixture is from about 200 to about 800.

4. The polyurethane of claim 2 wherein at least one polyol in the mixture is a polyether polyol derived from the reaction of at least one 1,2-alkylene oxide and at least one starter compound possessing at least one reactive hydrogen atom.

5. The polyurethane of claim 4 wherein the polyether polyol is derived from the reaction of at least one 1,2-alkylene oxide selected from the group consisting of ethylene oxide, propylene oxide, butylene oxide and at least one starter compound selected from the group consisting of water, ethylene glycol, 1,2-propylene glycol, 1,3-propylene glycol, 1,4-butylene glycol, 2,3-butylene glycol, 1,6-hexanediol, 1,8-octanediol, neopentylene glycol, 1,4-bis-hydroxymethyl cyclohexane, 2-methyl-1,3-propanediol, glycerol, trimethylol propane, 1,2,6-hexanetriol, penetaerythritol, mannitol, sorbitol, methyl glucoside, sucrose, resorcinol, hydroquinone, 1,1,3-tris-(hydroxyphenyl) propane, ammonia, ethylene diamine, tetramethylene diamine, hexamethylene diamine, diethylene triamine, ethanolamine, diethanolamine, triethanolamine, aniline, phenylene diamine, 2,4-diaminotoluene, 2,6-diaminotoluene, polyphenyl-polymethylene-polyamine and phenolformaldehyde resin.

6. The polyurethane of claim 4 wherein the polyether polyols is a polymer/polyol.

7. The polyurethane of claim 2 wherein at least one polyol in the mixture is a polyester polyol derived from the reaction of at least one polyhydric alcohol with at least one polyvalent carboxylic acid and/or anhydride thereof.

8. The polyurethane of claim 7 wherein the polyhydric alcohol is at least one member of the group consisting of ethylene glycol, 1,2-propylene glycol, 1,3-propylene glycol, 1,4-butylene glycol, 2,3-butylene glycol, 1,6-hexanediol, 1,8-octanediol, neopentylene glycol, cyclohexane dimethanol, (1,4-bis-hydroxymethylcyclohexane), 2-methyl-1,3-propane diol, glycerol, trimethylol propane, 1,2,6-hexanetriol, trimethylol propane, 1,2,6-hexane triol, trimethylol ethane, pentaerythritol, quinitol, mannitol, sorbitol, methyl glucoside, diethylene glycol, triethylene glycol, tetraethylene glycol, polyethylene glycol, dipropylene glycol, polypropylene glycol, dibutylene glycol and polybutylene glycol and the polyvalent carboxylic acid and/or anhydride thereof is at least one member of the group consisting of succinic acid, adipic acid, suberic acid, azelaic acid, sebacic acid, phthalic acid, isophthalic acid, trimellitic acid, phthalic acid anhydride, tetrahydrophthalic acid anhydride, hexahydrophthalic acid anhydride, tetrachlorophthalic acid anhydride, endomethylene tetrahydrophthalic acid anhydride, glutaric acid anhydride, maleic acid, maleic acid anhydride, fumaric acid, dimeric fatty acid, trimeric fatty acid, terephthalic acid dimethyl ester and terephthalic acid-bis-glycol ester.

9. The polyurethane of claim 2 wherein at least one polyol in the mixture is a polyester polyol derived from a lactone.

10. The polyurethane of claim 9 wherein the lactone is epsilon-caprolactone.

11. The polyurethane of claim 2 wherein at least one polyol in the mixture is a hydroxyl-terminated polybutadiene.

12. The polyurethane of claim 2 wherein at least one polyol in the mixture is selected from the group consisting of polythioether, polyacetal, polycarbonate, polyester amide, hydroxyl-terminated diene polymer, polyhydroxy compound possessing the urethane group, polyhydroxy compound possessing the urea group, modified naturally occurring polyol, carbohydrate, addition product of alkylene oxide with phenol-formaldehyde resin and addition product of alkylene oxide with urea-formaldehyde resin.

13. The polyurethane of claim 2 wherein at least one polyol in the mixture is a relatively low molecular weight trimethylol propane-propylene oxide adduct and at least one other polyol in the mixture is a relatively high molecular weight polypropylene glycol.

14. The polyurethane of claim 2 wherein at least one polyol in the mixture is a relatively low molecular weight trimethylol propane-propylene oxide adduct and at least one other polyol in the mixture is a relatively high molecular weight hydroxyl-terminated polybutadiene.

15. The polyurethane of claim 2 wherein the polyisocyanate is at least one member of the group consisting of ethylene diisocyanate, 1,4-tetramethylene diisocyanate, 1,6-hexamethylene diisocyanate, 1,12-dodecane diisocyanate, cyclobutane-1,3-diisocyanate, cyclohexane-1,3-diisocyanate, cyclohexane-1,4-diisocyanate, 1-isocyanato-3,3,5-tri- methyl-5-isocyanato methyl cyclohexane; 2,4-hexahydrotolyl- ene diisocyanate, 2,6-hexahydrotolylene diisocyanate, hexahydro-1,3-diisocyanate, 1,4-phenylene diisocyanate, perhydro-4,4'-diphenylmethane diisocyanate, 4,4'-diphenylmethane diisocyanate, 1,3-diisocyanate, 1,4-phenylene diisocyanate, 2,4- tolylene diisocyanate, 2,6-tolylene diisocyanate, diphenylmethane-2,4'-diisocyanate, 4,4'-diisocyanate, naphthylene-1,5-diisocyanate, triphenylmethane-4,4',4''-triisocyanate, polyphenylpolymethylene polyisocyanate, polyisocyanate possessing the carbodiimide group, polyisocyanate possessing the allophanate group, polyisocyanate possessing the isocyanurate group, polyisocyanate possessing the urethane group, polyisocyanate possessing the urea group and polyurethane possessing the biuret group.

16. The polyurethane of claim 2 wherein a chain extending agent is reacted with the mixture of polyols, polyisocyanate and optional blowing agent, said chain extending being at least one member of the group consisting of ethylene glycol, 1,3-propylene glycol, 1,3-butylene glycol, 1,4-butanediol, butenediol, butynediol, amylene glycol, neopentylene glycol, 1,4-phenylene-bis-(beta-hydroxyethyl) ether, 1,3-phenylene-bis-(beta-hydroxyethyl) ether, bis-(hydroxymethyl)-cyclohexane, 1,6 hexanediol, diethylene glycol, dipropylene glycol, N-phenyldiethanolamine, N-phenyldiisopropanolamine, ethanolamine, diethanolamine, 2-hydroxyethyl-N-amino benzene, ethylene diamine, propylene diamine, butylene diamine, hexamethylene diamine, cyclohexylene diamine, phenylene diamine, tolylene diamine, xylyene diamine, 3,3'-dichlorobenzidene, 3,3'-dinitrobenzidine, 4,4'-methylene-bis(2-chloraniline), 3,3-dichloro-4,4'-biphenylene diamine, 2,6-diamino pyridine, 4,4'-diamino diphenylmethane, hydrazine, N,N'-dimethyl hydrazine, 1,6-hexamethylene-bis-hydrazine, carbodihydrazide, adipic acid dihydrazide, oxalic acid dihydrazide, isophthalic acid dihydrazide, thiodipropionic acid dihydrazide, tartaric acid dihydrazide, 1,3-phenylenedisulfonic acid dihydrazide, omega-aminocaproic acid dihydrazide and bis-hydrazine carbonic ester of a glycol.

17. The polyurethane of claim 2 containing at least one additive selected from the group consisting of filler, pigment, surfactant, plasticizer and, where said polyurethane is a foam, a foam stabilizer.

18. The polyurethane of claim 1 possessing a Shore "00" hardness according to ASTM D2240 of from about 15 to about 85.

19. The polyurethane of claim 18 possessing a Shore "00" hardness according to ASTM D2240 of from about 30 to about 75.

20. The polyurethane of claim 1 possessing a resilience according to Zwick Rebound Pendulum DIN 53512 of from about 25% or less.

21. The polyurethane of claim 20 possessing a resilience according to Zwick Rebound Pendulum DIN 53512 of from about 20% or less.

22. The polyurethane of claim 1 possessing a ball rebound resilience according to ASTM D3574-H of from about 20% or less.

23. The polyurethane of claim 22 possessing a ball rebound resilience according to ASTM D3574-H of from about 15% or less.

24. The polyurethane of claim 1 possessing a tear resistance according to ASTM D3574-F of at least about 5 PLI.

25. The polyurethane of claim 24 possessing a tear resistance according to ASTM D3574 of at least about 7 PLI.

26. An article fabricated from the polyurethane of claim 1.

27. An article fabricated from the polyurethane of claim 2.

28. The article of claim 27 which is a shoe sole insert

29. The article of claim 27 which is a dynamic energy absorption device.

30. The article of claim 29 which is a vibration energy absorption device.

31. A process for preparing a non-liquid, energy-absorbing polyurethane which comprises reacting a mixture of linear and branched polyols, a polyisocyanate and, optionally, a blowing agent, under polyurethane-forming condition at an isocyanate index of from bout 65 to abut 85.

32. The process of claim 31 wherein the polyol comprises a mixture of at least one relatively high molecular weight polyol possessing two or three hydroxyl groups and having an equivalent weight of from about 500 to about 1500 and at least one relatively low molecular weight polyol possessing at least three hydroxyl groups and having an equivalent weight of from about 60 to about 200, the equivalent weight of the polyol mixture being from about 200 to about 1200 and the ratio of relatively high molecular weight to the ratio of relatively low molecular weight polyol equivalents being from about 1:0.8 to about 1:3.5.

33. The process of claim 32 wherein the resulting polyurethane possesses a Shore "00" hardness of from about 15 to about 85 and the average equivalent weight of the polyol mixture is from about 200 to about 800.

34. The process of claim 32 wherein at least one polyol in the mixture is a polyether polyol derived from the reaction of at least one 1,2-alkylene oxide and at least one starter compound possessing at least one reactive hydrogen atom.

35. The process of claim 34 wherein the polyether polyol is derived from the reaction of at least one 1,2-alkylene oxide selected from the group consisting of ethylene oxide, propylene oxide, butylene oxide and at least one starter compound selected from the group consisting of water, ethylene glycol, 1,2-propylene glycol, 1,3-propylene glycol, 1,4-butylene glycol, 2,3-butylene glycol, 1,6-hexanediol, 1,8-octanediol, neopentylene glycol, 1,4-bis-hydroxymethyl cyclohexane, 2-methyl-1,3-propanediol, glycerol, trimethylol propane, 1,2,6-hexanetriol, penetaerythritol, mannitol, sorbitol, methyl glucoside, sucrose, resorcinol, hydroquinone, 1,1,3-tris(hydroxyphenyl) propane, ammonia, ethylene diamine, tetramethylene diamine, hexamethylene diamine, diethylene triamine, ethanolamine, diethanolamine, triethanolamine, aniline, phenylene diamine, 2,4-diaminotoluene, 2,6-diaminotoluene, polyphenyl-polymethylene-polyamine and phenolformaldehyde resin.

36. The process of claim 34 wherein the polyether polyols is a polymer/polyol.

37. The process of claim 32 wherein at least one polyol in the mixture is a polyester polyol derived from the reaction of at least one polyhydric alcohol with at least one polyvalent carboxylic acid and/or anhydride thereof.

38. The process of claim 37 wherein the polyhydric alcohol is at least one member of the group consisting of ethylene glycol, 1,2-propylene glycol, 1,3 -propylene glycol, 1,4-butylene glycol, 2,3-butylene glycol, 1,6-hexanediol, 1,8-octanediol, neopentylene glycol, cyclohexane dimethanol, (1,4-bis-hydroxymethylcyclohexane), 2-methyl-1,3-propane diol, glycerol, trimethylol propane, 1,2,6-hexanetriol, trimethylol propane, 1,2,6-hexane triol, trimethylol ethane, pentaerythritol, quinitol, mannitol, sorbitol, methyl glucoside, diethylene glycol, triethylene glycol, tetraethylene glycol, polyethylene glycol, dipropylene glycol, polypropylene glycol, dibutylene glycol and polybutylene glycol and the polyvalent carboxylic acid and/or anhydride thereof is at least one member of the group consisting of succinic acid, adipic acid, suberic acid, azelaic acid, sebacic acid, phthalic acid, isophthalic acid, trimellitic acid, phthalic acid anhydride, tetrahydrophthalic acid anhydride, hexahydrophthalic acid anhydride, tetrachlorophthalic acid anhydride, endomethylene tetrahydrophthalic acid anhydride, glutaric acid anhydride, maleic acid, maleic acid anhydride, fumaric acid, dimeric fatty acid, trimeric fatty acid, terephthalic acid dimethyl ester and terephthalic acid-bis-glycol ester.

39. The process of claim 32 wherein at least one polyol in the mixture is a polyester polyol derived from a lactone.

40. The process of claim 39 wherein the lactone is epsilion-caprolactone.

41. The process of claim 32 wherein at least one polyol in the mixture is a hydroxyl-terminated polybutadiene.

42. The process of claim 32 wherein at least one polyol in the mixture is selected from the group consisting of polythioether, polyacetal, polycarbonate, polyester amide, hydroxyl-terminated diene polymer, polyhydroxy compound possessing the urethane group, polyhydroxy compound possessing the urea group, modified naturally occurring polyol, carbohydrate, addition, product of alkylene oxide with phenol-formaldehyde resin and addition product of alkylene oxide with urea-formaldehyde resin.

43. The process of claim 32 wherein at least one polyol in the mixture is a relatively low molecular weight trimethylol propane-propylene oxide adduct and at least one other polyol in the mixture is a relatively high molecular weight polypropylene glycol.

44. The process of claim 32 wherein at least one polyol in the mixture is a relatively low molecular weight trimethylol propane-propylene oxide adduct and at least one other polyol in the mixture is a relatively high molecular weight hydroxyl-terminated polybutadiene.

45. The process of claim 32 wherein the polyisocyanate is at least one member of the group consisting of ethylene diisocyanate, 1,4-tetramethylene diisocyanate, 1,6-hexamethylene diisocyanate, 1,12-dodecane diisocyanate, cyclobutane-1,3-diisocyanate, cyclohexane-1,3-diisocyanate, cyclohexane-1,4-diisocyanate, 1-isocyanato- 3,3,5-trimethyl-5-isocyanato methyl cyclohexane; 2,4-hexahydrotolylene diisocyanate, 2,6-hexahydrotolylene diisocyanate, hexahydro-1,3-diisocyanate, 1,4-phenylene diisocyanate, perhydro-4,4'-diphenylmethane diisocyanate, 4,4'-diphenylmethane diisocyanate, 1,3-diisocyanate, 1,4-phenylene diisocyanate, 2-4-tolyelene dissocyanate, 2,6-tolylene diisocyanate, diphenylmethane-2,4'-diisocyanate, 4,4'-diisocyanate, naphthylene-1, 5-diisocyanate, triphenylmethane-4,4',4"-triisocyanate, polyphenyl-polymethylene polyisocyanate, polyisocyanate possessing the carbodiimide group, polyisocyanate possessing the allophanate group, polyisocyanate possesing the isocyanurate group, polyisocyanate possesing the urethane group, polyisocyanate possessing the urea group and polyurethane possessing the biuret group.

46. The process of claim 32 wherein a chain extending agent is reacted with the mixture of polyols, polyisocyanate and optional blowing agent, said chain extending being at least one member of the group consisting of ethylene glycol, 1,3-propylene glycol, 1,3-butylene glycol, 1,4-butanediol, butenediol, butynediol, amylene glycol, neopentylene glycol, 1,4-phenylene-bis-(betahydroxyethyl) ether, 1,3-phenylene-bis-(betahydroxyethyl) ether, bis-(hydroxymethyl)-cyclohexane, 1,6 hexanediol, diethylene glycol, dipropylene glycol, N-phenyl-diethanolamine, N-phenyldiisopropanolamine, ethanolamine, diethanolamine, 2-hydroxyethyl-N-amino benzene, ethylene diamine, propylene diamine, butylene diamine, hexamethylene diamine, cyclohexylene diamine, phenylene diamine, tolylene diamine, xylyene diamine, 3,3'-dichlorobenzidene, 3,3'-dinitrobenzidine, 4,4'-methylene-bis(2-chloraniline), 3,3-dichloro-4,4'-biphenylene diamine, 2,6-diamino pyridine, 4,4'-diamino diphenylmethane, hydrazine, N,N'-dimethyl hydrazine, 1,6-hexamethylene-bis-hydrazine, carbodihydrazide, adipic acid dihydrazide, oxalic acid dihydrazide, isophthalic acid dihydrazide, thiodipropionic acid dihydrazide, tartaric acid dihydrazide, 1,3-phenylenedisulfonic acid dihydrazide, omega-aminocaproic acid dihydrazide and bis-hydrazine carbonic ester of a glycol.

47. The process of claim 32 containing at least one additive selected from the group consisting of filler, pigment, surfactant, plasticizer and, where said polyurethane is a foam, a foam stabilizer.

48. The process of claim 31 wherein the resulting polyurethane possesses a Shore "00" hardness according to ASTM D2240 of from about 15 to about 85.

49. The process of claim 48 wherein the resulting polyurethane possesses a Shore "00" hardness according to ASTM D2240 of from about 30 to about 75.

50. The process of claim 31 wherein the resulting polyurethane possesses a resilience according to Zwick Rebound Pendulum DIN 53512 of from about 25% or less.

51. The process of claim 50 wherein the resulting polyurethane possesses a resilience according to Zwick Rebound Pendulum DIN 53512 of from about 20% or less.

52. The process of claim 31 wherein the resulting polyurethane possesses a ball rebound resilience according to ASTM D3574-H of from about 20% or less.

53. The process of claim 52 wherein the resulting polyurethane possesses a ball rebound resilience according to ASTM D3574-H of from about 15% or less.

54. The process of claim 31 wherein the resulting polyurethane possess a tear resistance according to ASTM D3574-F of at least about 5 PLI.

55. The process of claim 54 wherein the resulting polyurethane possesses a tear resistance according to ASTM D3574 of at least about 7 PLI.

* * * * *